US010782849B2

(12) United States Patent
Delia et al.

(10) Patent No.: US 10,782,849 B2
(45) Date of Patent: *Sep. 22, 2020

(54) DESIGNATING TASK EXECUTION ORDER BASED ON LOCATION OF THE TASK ICONS WITHIN A GRAPHICAL USER INTERFACE

(71) Applicant: International Business Machines Corporation, Armonk, NY (US)

(72) Inventors: Wayne M. Delia, Poughkeepsie, NY (US); Stuart B. Tener, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 866 days.

This patent is subject to a terminal disclaimer.

(21) Appl. No.: 15/095,635

(22) Filed: Apr. 11, 2016

(65) Prior Publication Data

US 2016/0224212 A1    Aug. 4, 2016

Related U.S. Application Data

(63) Continuation of application No. 13/024,670, filed on Feb. 10, 2011, now Pat. No. 9,311,061.

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 8/34* (2013.01); *G06F 9/5038* (2013.01)

(58) Field of Classification Search
CPC ....... H04L 41/22; H04L 67/02; H04L 67/125; H04L 63/02; H04L 63/08; H04L 67/025;
(Continued)

(56) References Cited

U.S. PATENT DOCUMENTS 5,159,324 A * 10/1992 Ohtani .................... G06F 3/147
345/902
5,497,455 A * 3/1996 Suga ...................... G06F 3/0481
715/810

(Continued)

*Primary Examiner* — Steven B Theriault
(74) *Attorney, Agent, or Firm* — Scully, Scott, Murphy & Presser, P.C.; Scott Dobson, Esq.

(57) ABSTRACT

A method, system and computer program product for designating the order in which a plurality of tasks are to be executed on a computer system. In one embodiment, a plurality of task icons, each of which represents a respective one task, are shown in defined positions in a view on the computer system, and these defined positions of the task icons are used to determine the order in which the tasks are to be executed by the computer system. In an embodiment, the task icons are shown in a grid pattern, having rows and columns. Tasks represented by task icons shown in successive rows of the grid pattern are executed in series, and tasks represented by task icons shown in the same row of the grid pattern are executed in parallel. In an embodiment, at least one of the task icons represents an embedded executable workflow folder.

20 Claims, 6 Drawing Sheets

SEQUENCE OF EXECUTABLE OBJECTS AND EMBEDDED WORKFLOWS, BYPASSING NON-EXECUTABLE OBJECTS

(51) Int. Cl.
   *G06F 8/34*     (2018.01)
   *G06F 3/0482*   (2013.01)
   *G06F 9/50*     (2006.01)

(58) Field of Classification Search
   CPC ..... H04L 12/585; H04L 51/12; H04L 63/145;
         H04L 12/1818; H04L 12/1827; H04L
         12/582; H04L 12/584; H04L 51/046;
         H04L 51/08; H04L 65/00; H04L 67/10;
         H04L 67/16; H04L 67/34; G06F 3/04817;
         G06F 9/5038; G06F 3/0482; G06F 8/34;
         G06F 3/0481–0489
   See application file for complete search history.

(56) References Cited

U.S. PATENT DOCUMENTS

| | | | | |
|---|---|---|---|---|
| 5,544,299 | A * | 8/1996 | Wenstrand | G06F 9/451 715/804 |
| 5,548,692 | A * | 8/1996 | Cok | G06T 11/60 345/667 |
| 5,576,946 | A * | 11/1996 | Bender | G05B 19/41865 700/17 |
| 5,592,605 | A * | 1/1997 | Asuma | G06F 3/0483 715/775 |
| 5,623,592 | A * | 4/1997 | Carlson | G06F 8/34 700/83 |
| 5,787,434 | A | 7/1998 | Nakamura et al. | |
| 5,826,237 | A * | 10/1998 | Macrae | G06F 8/71 705/2 |
| 5,841,959 | A * | 11/1998 | Guiremand | B25J 9/1671 345/440 |
| 5,850,221 | A * | 12/1998 | Macrae | G06F 8/34 715/853 |
| 5,987,471 | A | 11/1999 | Bodine et al. | |
| 6,028,604 | A | 2/2000 | Matthews, III et al. | |
| 6,064,821 | A * | 5/2000 | Shough | G06F 11/3017 709/203 |
| 6,182,285 | B1 * | 1/2001 | Bleizeffer | G06F 16/21 717/170 |
| 6,239,800 | B1 * | 5/2001 | Mayhew | G06F 8/61 715/764 |
| 6,259,444 | B1 | 7/2001 | Palmer et al. | |
| 6,286,137 | B1 * | 9/2001 | Bleizeffer | G06F 9/44505 715/705 |
| 6,323,882 | B1 | 11/2001 | Jerome et al. | |
| 6,388,683 | B1 | 5/2002 | Ishai et al. | |
| 6,392,670 | B1 * | 5/2002 | Takeuchi | G06F 16/9558 715/760 |
| 6,544,123 | B1 * | 4/2003 | Tanaka | A63F 13/10 463/36 |
| 6,661,438 | B1 * | 12/2003 | Shiraishi | G06F 1/1626 715/781 |
| 6,754,900 | B1 | 6/2004 | Kelley et al. | |
| 6,833,847 | B1 * | 12/2004 | Boegner | G06F 9/453 715/705 |
| 6,892,360 | B1 * | 5/2005 | Pabla | G06F 3/0482 715/802 |
| 6,928,625 | B2 * | 8/2005 | Makinen | G06F 3/0481 700/110 |
| 6,948,173 | B1 * | 9/2005 | Isom | G06F 9/4806 718/100 |
| 7,000,187 | B2 * | 2/2006 | Messinger | G06F 9/453 715/705 |
| 7,249,048 | B1 * | 7/2007 | O'Flaherty | G06Q 10/0633 705/7.27 |
| 7,707,571 | B1 | 4/2010 | Harris et al. | |
| 7,827,476 | B1 | 11/2010 | Roberts et al. | |
| 7,895,526 | B2 * | 2/2011 | Evans | G06F 3/0481 715/762 |
| 7,925,985 | B2 * | 4/2011 | Moore | G05B 23/0267 715/772 |
| 7,996,239 | B1 * | 8/2011 | Pellican | G06Q 10/10 705/2 |
| 8,578,271 | B2 * | 11/2013 | Laugwitz | G06F 3/0482 715/712 |
| 8,645,854 | B2 * | 2/2014 | Kopycinski | G06Q 10/10 709/223 |
| 8,913,729 | B2 * | 12/2014 | Sarkar | H04L 41/5054 379/201.12 |
| 9,317,837 | B2 * | 4/2016 | Cok | G06Q 10/103 |
| 2002/0154153 | A1 * | 10/2002 | Messinger | G06F 9/453 715/705 |
| 2002/0160817 | A1 * | 10/2002 | Salmimaa | G06F 3/04817 455/566 |
| 2002/0188597 | A1 | 12/2002 | Kern et al. | |
| 2003/0007005 | A1 * | 1/2003 | Kandogan | G06F 3/04817 715/763 |
| 2003/0061266 | A1 * | 3/2003 | Ouchi | G06Q 10/06 718/106 |
| 2003/0063128 | A1 * | 4/2003 | Salmimaa | G06F 3/04817 715/810 |
| 2003/0071843 | A1 * | 4/2003 | Hoff | G06F 16/30 715/763 |
| 2003/0081002 | A1 * | 5/2003 | De Vorchik | G06F 9/453 715/762 |
| 2003/0142125 | A1 * | 7/2003 | Salmimaa | G06F 3/04817 715/733 |
| 2004/0021643 | A1 * | 2/2004 | Hoshino | G06F 3/016 345/173 |
| 2004/0054566 | A1 | 3/2004 | J'Maev | |
| 2004/0119752 | A1 * | 6/2004 | Beringer | G06Q 10/06313 715/779 |
| 2004/0150664 | A1 * | 8/2004 | Baudisch | G06F 3/0486 715/740 |
| 2004/0169662 | A1 * | 9/2004 | Riemann | H04L 41/00 345/619 |
| 2004/0210868 | A1 * | 10/2004 | Dutsch | G05B 19/056 717/113 |
| 2004/0268258 | A1 * | 12/2004 | Lee | G06Q 30/02 715/708 |
| 2005/0015730 | A1 * | 1/2005 | Gunturi | G06F 9/451 715/777 |
| 2005/0022136 | A1 * | 1/2005 | Hatscher | G06F 3/0481 715/798 |
| 2005/0125268 | A1 * | 6/2005 | Danninger | G06Q 10/02 705/6 |
| 2005/0210473 | A1 * | 9/2005 | Inchingolo | G06F 9/4881 718/107 |
| 2005/0219578 | A1 * | 10/2005 | Hiraoka | H04N 1/00931 358/1.9 |
| 2005/0251747 | A1 * | 11/2005 | Dolling | G06Q 10/10 715/713 |
| 2006/0074735 | A1 * | 4/2006 | Shukla | G06F 8/34 705/80 |
| 2006/0080616 | A1 * | 4/2006 | Vogel | G06F 9/451 715/769 |
| 2006/0095853 | A1 * | 5/2006 | Amyot | G06Q 50/22 715/744 |
| 2006/0106846 | A1 | 5/2006 | Schulz et al. | |
| 2006/0126909 | A1 * | 6/2006 | Marshall | G06T 7/0012 382/128 |
| 2006/0168530 | A1 * | 7/2006 | Muller | G06Q 10/10 715/751 |
| 2007/0044009 | A1 * | 2/2007 | Tokunaga | G06F 8/20 715/202 |
| 2007/0063432 | A1 * | 3/2007 | Trudel | A63F 3/0415 273/139 |
| 2007/0089047 | A1 * | 4/2007 | Joshi | G06F 8/20 715/234 |
| 2007/0168861 | A1 * | 7/2007 | Bell | G06F 3/0481 715/701 |
| 2007/0226637 | A1 * | 9/2007 | Yaseen | G06Q 10/00 715/762 |
| 2007/0234210 | A1 * | 10/2007 | Bukovec | G06F 3/048 715/700 |
| 2008/0256492 | A1 * | 10/2008 | Yamamoto | G06F 9/451 715/856 |
| 2009/0048881 | A1 * | 2/2009 | Keane | G06Q 10/06 717/101 |

(56) References Cited

U.S. PATENT DOCUMENTS

| | | | |
|---|---|---|---|
| 2009/0089115 A1* | 4/2009 | Murthy | G06Q 10/00 |
| | | | 705/7.27 |
| 2009/0235194 A1* | 9/2009 | Arndt | G06F 9/451 |
| | | | 715/772 |
| 2010/0095248 A1 | 4/2010 | Karstens | |
| 2010/0333022 A1* | 12/2010 | Inoue | G06F 3/04895 |
| | | | 715/811 |
| 2011/0145738 A1* | 6/2011 | Laugwitz | G06F 3/0482 |
| | | | 715/763 |
| 2011/0179371 A1* | 7/2011 | Kopycinski | G06Q 10/10 |
| | | | 715/772 |
| 2011/0191611 A1 | 8/2011 | Boni Ang Gaw Go et al. | |
| 2011/0231798 A1* | 9/2011 | Cok | G06F 3/04817 |
| | | | 715/823 |
| 2012/0092266 A1* | 4/2012 | Akella | G01C 21/3614 |
| | | | 345/173 |
| 2012/0185776 A1 | 7/2012 | Kirshenbaum et al. | |
| 2012/0210265 A1 | 8/2012 | Delia et al. | |
| 2015/0069029 A1* | 3/2015 | Daniel | B23K 9/0953 |
| | | | 219/125.1 |
| 2016/0041719 A1* | 2/2016 | Wang | G06F 3/04883 |
| | | | 715/769 |

\* cited by examiner

INITIATION OF THE WORKFLOW FOLDER

PROCESS FLOW OF WORKFLOW TASKS BASED ON GEOMETRIC LOCATION IN GUI FOLDER

DESIGNATING TASK EXECUTION ORDER BASED ON LOCATION OF THE TASK ICONS WITHIN A GRAPHICAL USER INTERFACE

CROSS REFERENCE TO RELATED APPLICATION

This application is a continuation application of copending U.S. patent application Ser. No. 13/024,670, filed Feb. 10, 2011, the entire contents and disclosure of which are hereby incorporated herein by reference.

BACKGROUND OF THE INVENTION

This invention generally relates to determining the order in which to execute tasks in a computer system, and more specifically, to using a graphical user interface to determine that order.

Desktop graphical user interfaces (GUI) in most common workstation operating systems provide views of folder content in several different formats, including the placement of large icons representing objects contained in the folder. For example, one system folder used in the Windows Operating System contains applications to be initiated or executable tasks to be processed during workstation bootup operations. These applications and tasks are typically initiated in an unspecified sequence, executing in parallel until all are completed. Because certain applications have prerequisite background services which must be started up before the applications can initiate, these applications requiring the background services cannot be included in the default Startup folder, and must be manually initiated after the required background services are available.

For example, a user of a computer workstation might wish to have an email client and an instant messaging client automatically initiated when the workstation is started up. These applications will fail to initiate unless a connection has been previously made to access the Internet, and that connection client may also fail if particular network services have not yet been established. Thus, a simple method is needed to designate particular sequential and parallel processing of all executable tasks contained within a graphical user interface.

Known solutions include an automatic parallel-only execution of programs included in the system startup folder with no way to designate conditional or sequential execution of tasks. Full-featured workflow management software exists, such as i2 Corporation's Informatica tool, but these require extremely complicated setup configurations, including identifying a specific fixed logical link between parent and child tasks. No solution currently exists in which the execution sequence of tasks within a folder can be identified more simply and efficiently by the geometric location of the icons in the GUI representation.

BRIEF SUMMARY

Embodiments of the invention provide a method, system and computer program product for designating the order in which a plurality of tasks are to be executed on a computer system. In one embodiment, the method comprises showing a plurality of task icons in defined positions in a view on the computer system, each of the task icons representing a respective one task; and using said defined positions to determine the order in which the tasks are to be executed by the computer system.

In an embodiment, the task icons are shown in a defined spatial order, and this defined spatial order is used to determine the order in which the tasks are to be executed by the computer system.

In one embodiment, some of the tasks are executed in parallel and others of the tasks are executed in series.

In an embodiment, the task icons are shown in a grid pattern, having rows and columns. Tasks represented by task icons shown in successive rows of the grip pattern are executed in series, and tasks represented by task icons shown in the same row of the grid pattern are executed in parallel.

For example, in an embodiment, different rows of the grid pattern may be located at different heights in the view. All the tasks represented by task icons in the same row are executed in parallel, and all of the tasks represented by the task icons in a higher row are executed before any of the tasks represented by the task icons in a lower row are executed.

In one embodiment, each of the task icons is shown in a defined geometric position. To determine the order in which the tasks are to be executed, a list is obtained of these geometric positions of the task icons, the geometric positions on this list are sorted according to defined rules to obtain a sorted list, and this sorted list is used to determine the order in which the tasks are to be executed.

In an embodiment, at least one of the task icons represents an embedded executable workflow folder.

In one embodiment, the task icons are shown in a graphical user interface, and this interface may be used to configure the positions of the task icons in the interface.

In one embodiment, data for rendering the task icons are stored in a specified file, and this file is designated as executable.

In an embodiment, a call is made to the Operating System of the computer system to obtain data for determining the positions of the task icons in the view; and the tasks are executed in the designated order upon startup of the Operating System.

Embodiments of the invention provide a method of grouping executable icons in a GUI operating system desktop folder, and designating an action during which every executable program in the folder is to be initiated in a combination of sequential and parallel tasks based on the geometric location of the task icons within the folder. This is a significant advantage over tasks in the default operating system startup folder, which are executed only in parallel, and is also an advantage over commercially-available workflow management software products in that the relationship between tasks is based on the geometric position of icons within the folder instead of depending on explicit relationships between individual programs.

DETAILED DESCRIPTION

Figure 1:
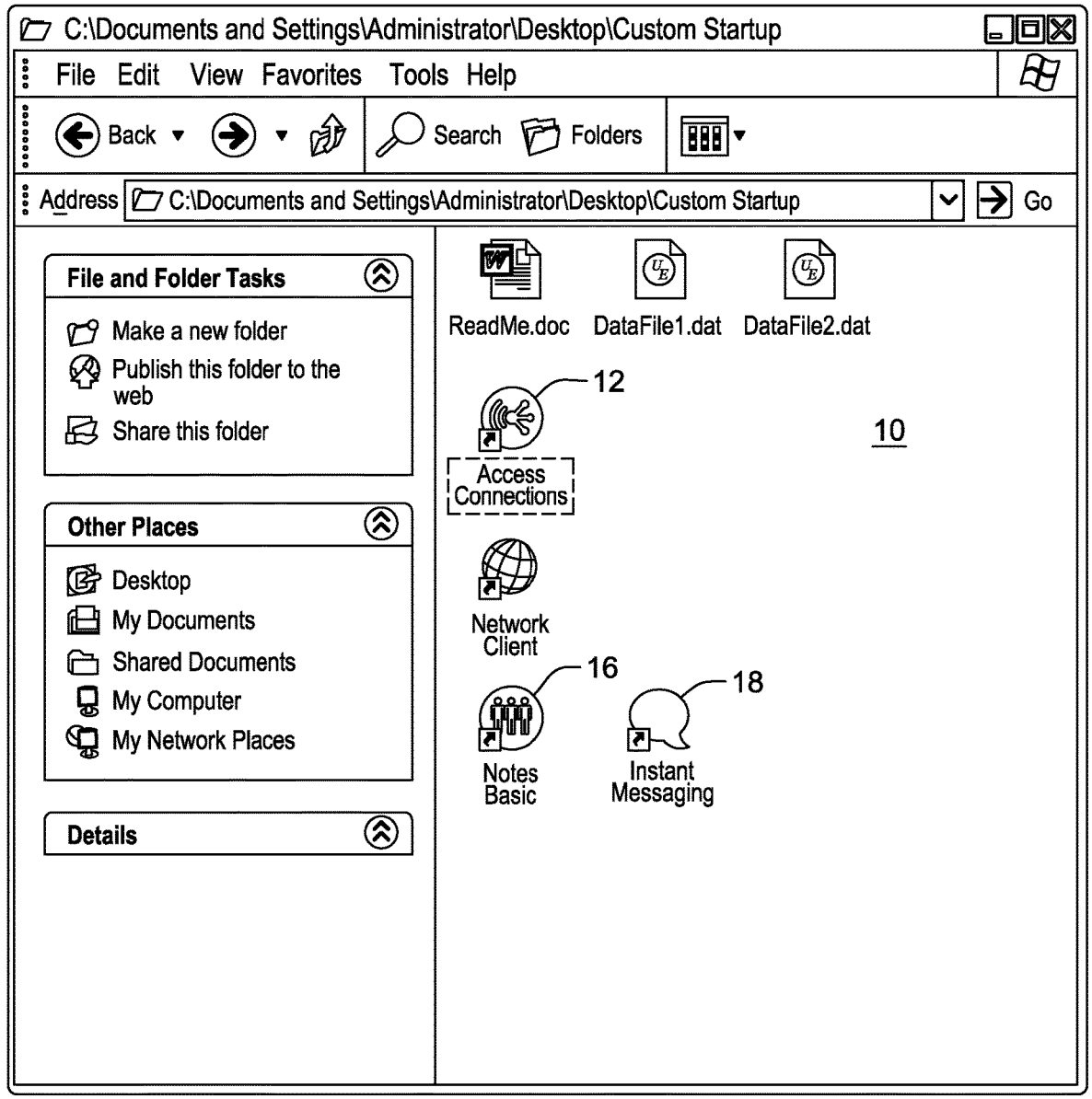
FIG. 1 illustrates icon representation of objects within a workflow folder, arranged in a grid.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention relates to using a graphical user interface to determine the order in which tasks are executed in a computer system. An embodiment of the invention designates a desktop folder as a collection of objects, including one or more executable objects, each of which is to be executed in relation to the geometric appearance of the icons within the folder. An embodiment of the invention provides a method for designating a folder to have this executable workflow. In the Windows Operating System platform, this may be done, for example, by a right-click selection on the folder to designate it as executable, or by setting a specified value in the folder's properties.

In an embodiment, in the UNIX, AIX or Linux Operating System platforms, the invention may be used to give meaningful context to assigning the "Executable" global or local permission to a directory folder. Currently, a folder in these platforms can be designated "executable" without having any specific meaning attached to it. One specific use of this invention, as an example, would be to a system startup folder, which (in the Windows Operating System environment) executes all included tasks in a single parallel step. As will be apparent to those of ordinary skill in the art, though, this invention can be extended to other folders not executed at system startup time.

A folder designated as an executable workflow based on geometric positioning of the icons may be limited to display only in icon format, preferably in an auto-grid arrangement, so that tasks to be executed in parallel may be found in the same row of icons, and subsequent tasks in later rows may be executed only after successful completion of all tasks in the previous rows. Display of objects in any other fashion (thumbnail, list, or detail list, for example) may not be applicable or permitted.

Once the folder is designated as an executable workflow, and a method is provided to initiate execution of the workflow, a determination of the order of execution is made based on the file types of the objects included in the folder, and the positions of the icons in the GUI display of the folder. This information is available via API (Application Programming Interface) calls to the operation system. The vertical position of each executable program/application icon relative to the rectangular grid of the folder window is collected and sorted. All tasks represented by icons with the same vertical height (which will be the case in auto-arranged grids of icons) would appear in the same row, and each would be executed in parallel. Icons with different vertical heights relative to the folder GUI view would occur in different rows; the applications and programs in a "higher" row would be executed sequentially before the applications and programs in a "lower" row.

The following discussion exemplifies the use of this invention in the startup folder in a Windows platform.

When a workstation is booted up, it is desirable to have all the standard background services start (as they usually do), then after those tasks are successfully completed, applications depending on the presence of those background services can be initiated. In the following example, the two applications Lotus Notes and an Instant Messaging client product are to be opened as part of the normal startup. These applications can successfully complete only after the AT&T Network Dialer executes successfully to access, for example, a corporate intranet. AT&T Dialer is a global network client for remoter access. Once a connection is made to the Internet, the AT&T Dialer can be used to gain access through a corporate firewall to a corporate intranet by way of passwords and configured authentication. The term "intranet" is a well known term describing a company's private network protecting its digital assets by means of Internet Protocol technologies to store and share data among users with common authentication credentials. Intranets are typically owned by single companies or corporations, and data security is a big concern.

In order for the Network Dialer to work, it needs to execute after successful completion of the Access Connections task (by executing the LEAP Template to connect a workstation to the wireless network). One way to ensure this sequence is to write a script executing the applications in the desired order, check the return code status, and reporting any problems. Another way is to designate a formal workflow via a workflow management package, requiring designation of predecessor tasks, successor tasks, and exception handling.

"LEAP Template" is a configuration scheme to detect and access network connections. The main function is to establish connection between a workstation and the Internet, or a workstation and a local internal network. A configuration file (referred to as "LEAP Template") includes information such as a default network connection using the best available installed network hardware (i.e., use Ethernet instead of wireless if both are installed and available), whether networks or locations should be switched automatically, and what authentication terms should be used for encrypted network or Internet access (i.e., WEP or WPI authentication keys). In the context of embodiments of this invention, it's the information and program required to make simple connection to the Internet from a workstation, which has to happen successfully before any other programs requiring an Internet connection can be started.

The present invention removes these requirements and establishes a task execution capability based on the position of the executable program or application icon within the folder GUI of the executable workflow folder. In embodiments of the invention, documentation, data files, or other non-executable objects within the folder are ignored.

FIG. 1 illustrates an icon representation 10 of objects within a workflow folder, arranged by grid. This directory is identified as an executable workflow folder, which in this case happens to be a folder executed on startup. (The folder itself is not actually executed, but the executable objects within the folder are processed in order of the icon appearance in successive rows.) Going top to bottom, in order of the icon positions, any executable program or application is initiated. In this example, the program "Access Connections" 12 (in the second row of icons) is the first program encountered, so it is executed. If and when it successfully completes, processing would proceed to the next row of icons and initiate any objects found to be applications, in this case initiating and executing AT&T Network Client. "AT&T Network Client" is synonymous with "AT&T Dialer." Once a connection is made to the Internet, this client program can be started which reads a different configuration file and establishes contact through, for example, a corporate firewall to the corporate intranet using stored accounts, userIDs, passwords, and other authentication credentials. Upon successful completion of AT&T Network Client, processing then proceeds to execute both Lotus Notes 8 Basic 16, and Instant Messaging client 18 in parallel. A fully sequential set of planned tasks would look like a vertical column of icons; a fully parallel execution of several different planned tasks would look like a single horizontal row of icons. The traditional Windows Startup folder would be an example of entirely parallel processing.

Figure 2:
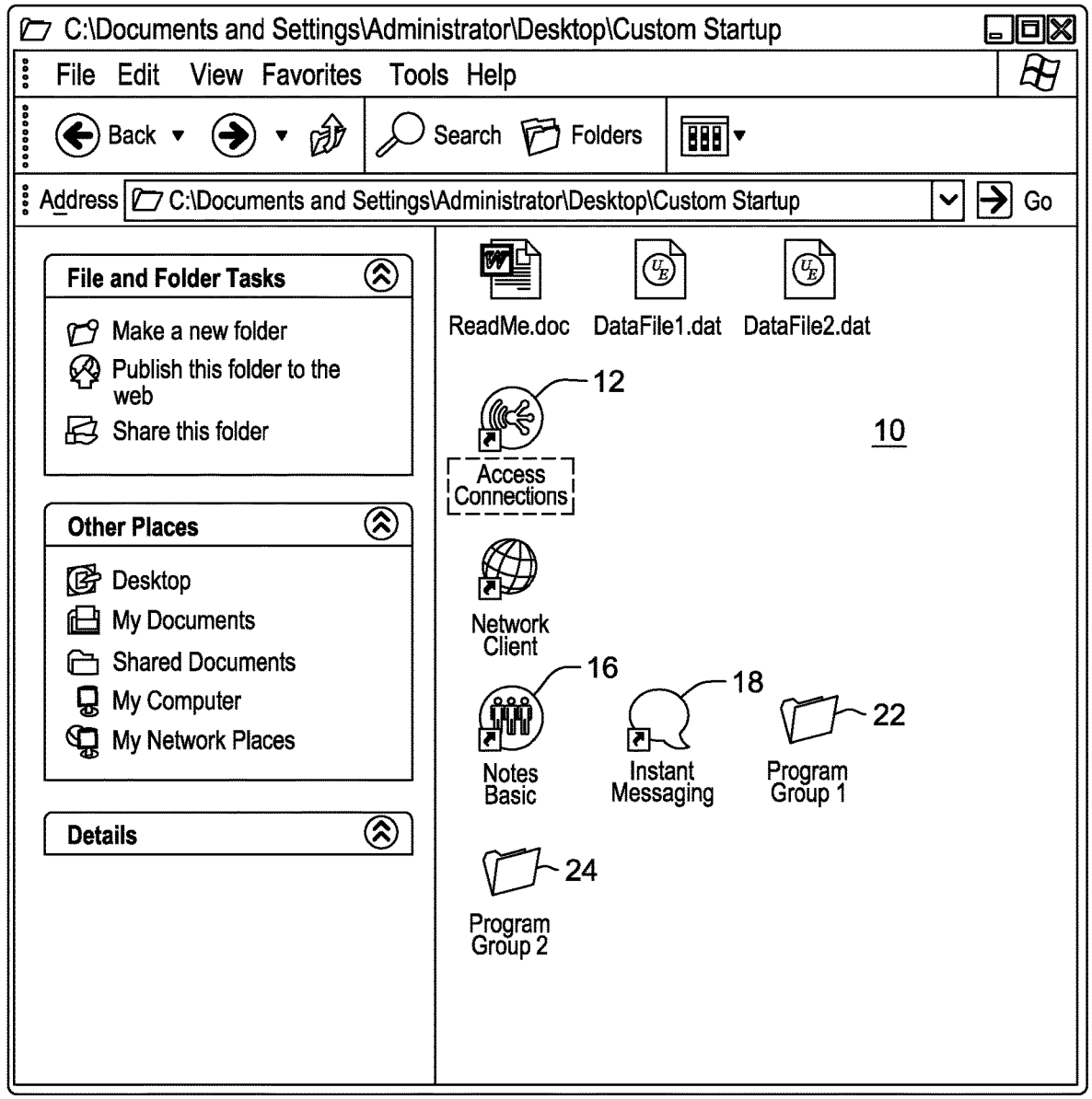
FIG. 2 shows icon representation of objects within a workflow folder, arranged in a grid, including embedded workflow folders.

In embodiments of the invention, instances of other "executable workflow folders" are also included in this starting executable folder. The icons might look as shown in FIG. 2. Suppose, for example, once the AT&T Network Client is active and running, in addition to the two applications 16, 18 in the next row, it is desirable to execute a group of programs 22 (called "Program Group 1"). When that is done, processing is to continue to execute another group of programs 24 (called "Program Group 2").

Figure 3:
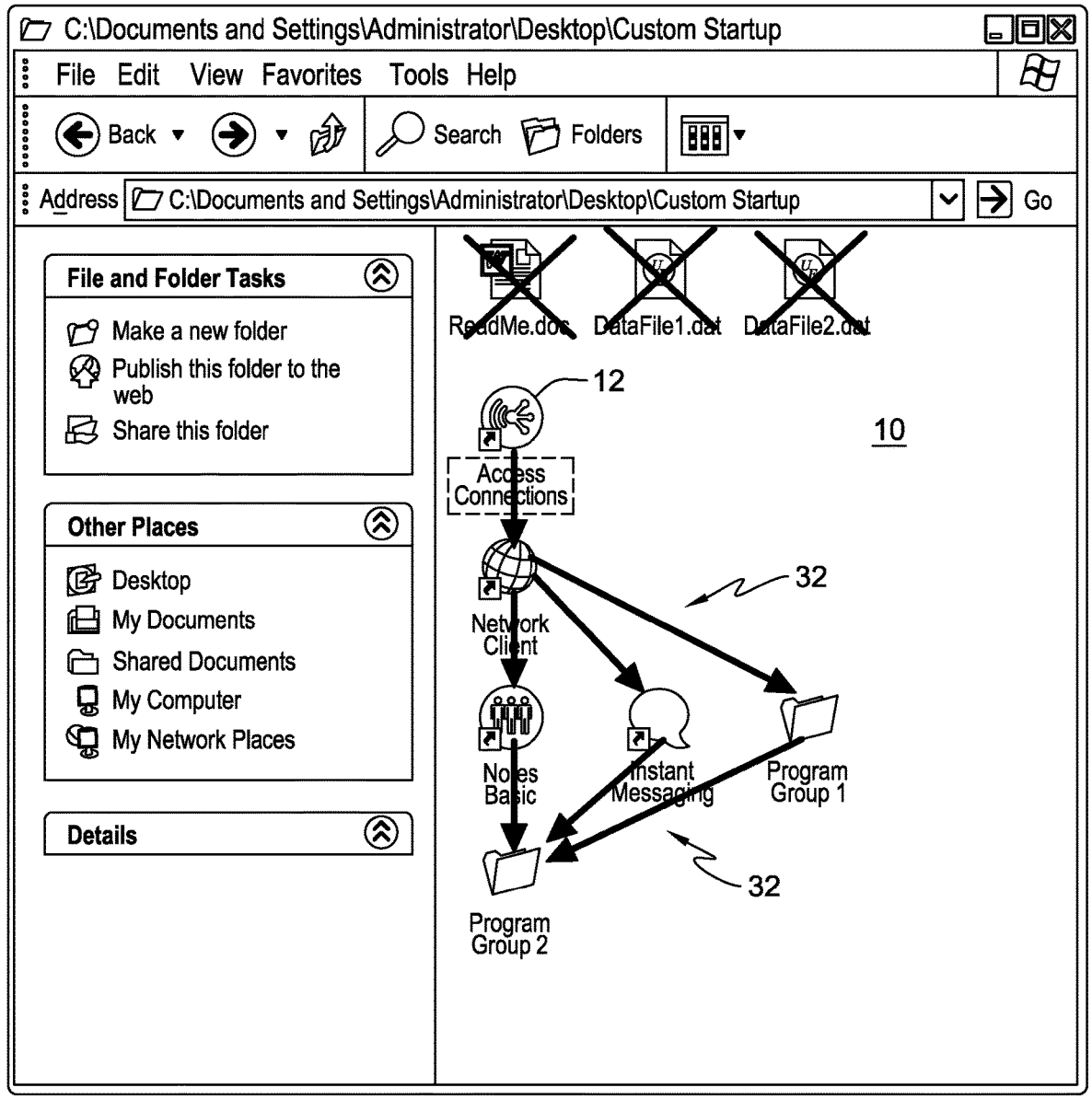
FIG. 3 illustrates the sequence of executable objects and workflows, bypassing non-executable objects.

If a commercially available workflow management software package was employed to have the same sequential and parallel processing effect as in the previous example, the inclusion of separate documentation or data file (non-executable) objects like ReadMe.doc, DataFile1.dat, and DataFile2.dat would not be relevant (or, in most cases, even possible), but the main advantage is that a workflow management software package would require the designation of "Access Connections" to be executed initially, and the designation of seven explicit relationships between the tasks to be included in the workflow. These seven relationships are represented, as illustrated in FIG. 3, by the arrows 32 overlaying the icons of FIG. 2, and would need to be designated explicitly as in the following table:

TABLE 1

Explicit sequential relationships required for traditional workflow management applications

| Step Number | Predecessor Task (Successful Completion Required) | Successor Task |
|---|---|---|
| 1 | Access Connections | AT&T Network Client |
| 2 | AT&T Network Client | Lotus Notes 8 Basic |
| 3 | AT&T Network Client | Instant Messaging Connect |

TABLE 1-continued

Explicit sequential relationships required for traditional workflow management applications

| Step Number | Predecessor Task (Successful Completion Required) | Successor Task |
|---|---|---|
| 4 | AT&T Network Client | Workflow defined in folder Program Group 1 |
| 5 | Lotus Notes 8 Basic | Workflow defined in folder Program Group 2 |
| 6 | Instant Messaging Connect | Workflow defined in folder Program Group 2 |
| 7 | Workflow defined in folder Program Group 1 | Workflow defined in folder Program Group 2 |

The graphic illustration of the custom-configured workflow is given in FIG. 3. Embodiments of this invention, based on geometric positioning of the icons in the folder GUI display do not require any of the explicit relationship definitions and enable relevant documentation and data files to be included in the same folder (workflow) as the executable objects. This advantage becomes more significant with the inclusion of two folders representing two additional groups of executable programs and other non-executable objects. Embodiments of this invention likewise do not require any specific relationship definitions within the sub-folders, which may become numerous.

Figure 4:
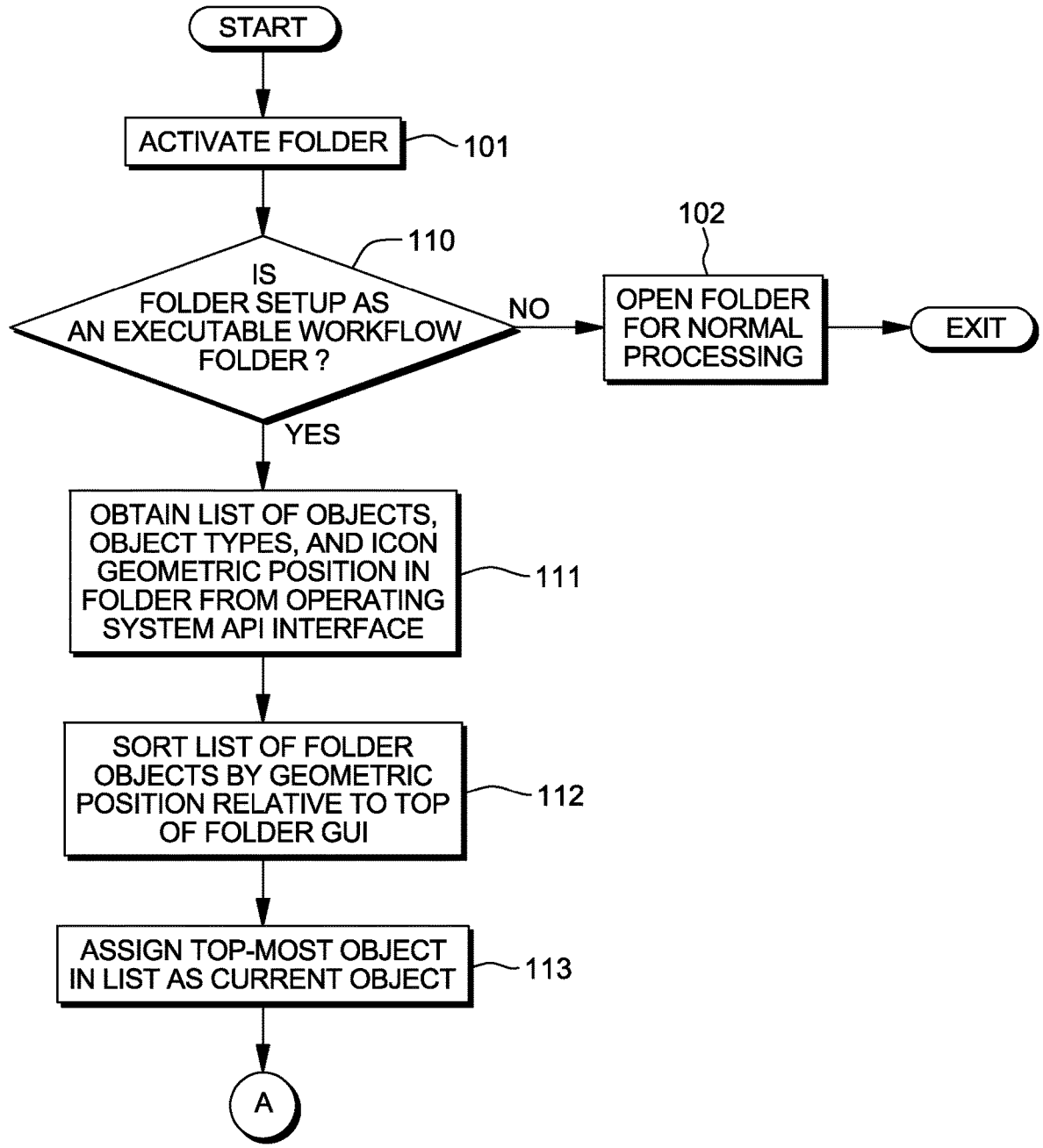
FIG. 4 is a flow chart showing the initialization of the workflow folder.
Figure 5:
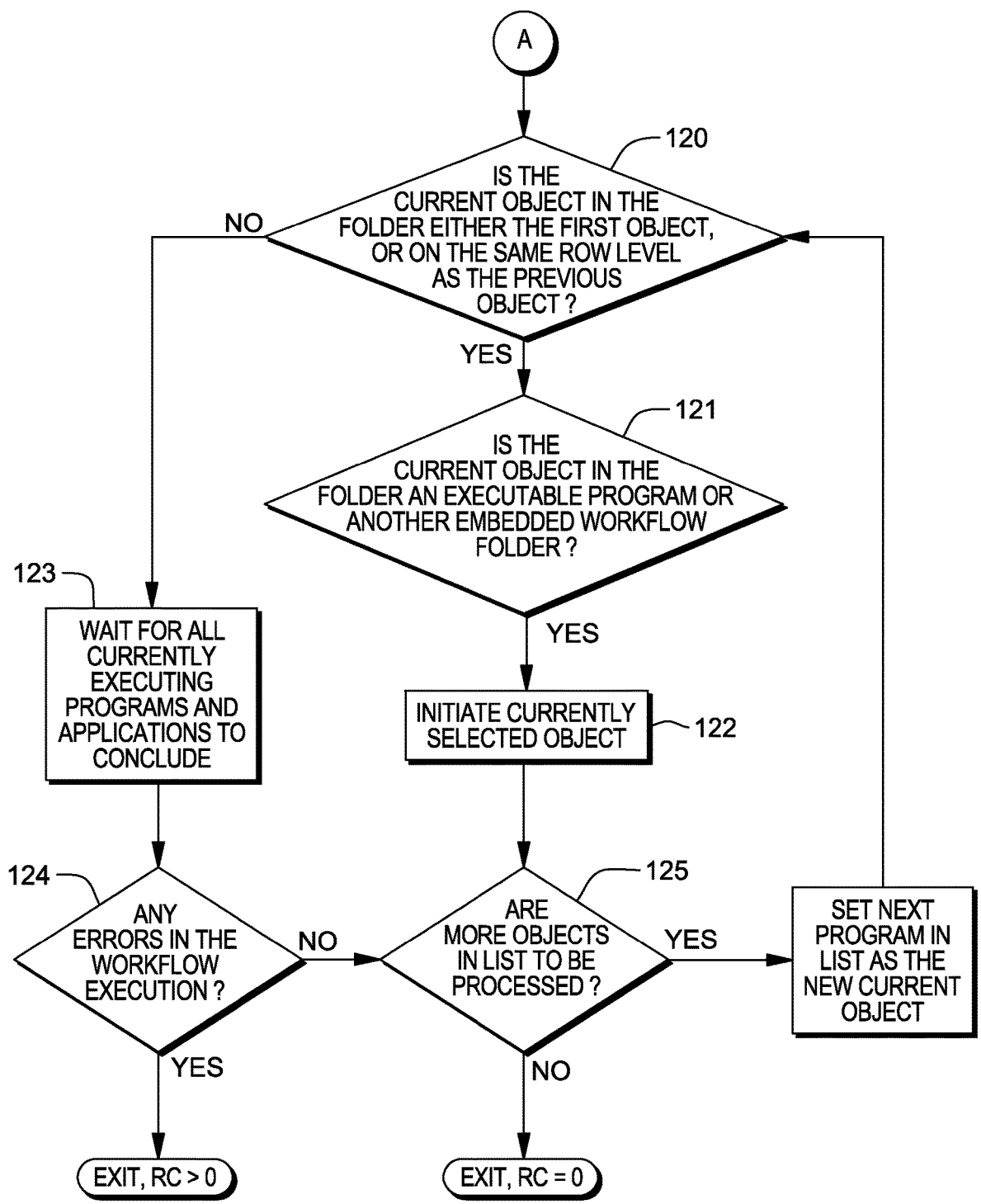
FIG. 5 is a continuation of the flow chart of FIG. 4 and illustrates the process flow of workflow tasks based on geometric location in the graphical user interface folder.

The process flow associated with determining the order of this workflow processing is depicted in FIGS. 4 and 5.

At step 101, the folder is activated. The folder can be activated by any of several different means. For example, the folder may be activated by: automatic execution if the workflow folder is designated to execute at the time of workstation bootup; right-click on a workflow folder icon on the desktop or other GUI display, selecting an "Execute workflow" option from the actions list; double-click on an icon representing a workflow folder, initiating execution as a default action on the folder; and including the executable folder as an object within another executable folder.

Step 110 is a decision point whether to open a regular folder (not marked as "executable workflow folder"), or to initiate execution of the objects in an "executable workflow folder", in the sequence and grouping order determined by the geometric position of the icons within the folder GUI.

As represented at 102, in embodiments of the invention, a normal folder does not have the capabilities taught in this invention, and a folder not marked as an executable workflow would be opened normally when initiated.

At step 111, an application programming interface (API) can be used by application programs to query the operating system for folder object parameter values such as object name, object type, and position of the icon associated with the object within the GUI display of the folder. An API call for the workflow depicted in FIG. 3 might return the following information:

TABLE 2

Workflow folder object parameter data returned from API call to operating system

| Object Name | Object Type | Pixels from top of folder |
|---|---|---|
| Access Connections | Executable program | 60 |
| AT&T Dialer | Executable program | 115 |
| DataFile1.dat | Non-executable file | 5 |
| DataFile2.dat | Non-executable file | 5 |

TABLE 2-continued

Workflow folder object parameter data returned from API call to operating system

| Object Name | Object Type | Pixels from top of folder |
|---|---|---|
| Lotus Notes 8 Basic | Executable application | 170 |
| Program Group 1 | Executable embedded workflow folder | 170 |
| Program Group 2 | Executable embedded workflow folder | 225 |
| ReadMe.doc | Non-executable file | 5 |
| Instant Messaging Connect | Executable application | 170 |

At step 112, the information is sorted by the third column (geometric position of icon within folder) and the result table in Table 3 is used as the list of tasks to be sequentially processed.

TABLE 3

Workflow folder object parameter data returned from API call to operating system, sorted by geometric position within the folder GUI display

| Object Name | Object Type | Pixels from top of folder |
|---|---|---|
| ReadMe.doc | Non-executable file | 5 |
| DataFile1.dat | Non-executable file | 5 |
| DataFile2.dat | Non-executable file | 5 |
| Access Connections | Executable program | 60 |
| AT&T Dialer | Executable program | 115 |
| Lotus Notes 8 Basic | Executable application | 170 |
| Instant Messaging Connect | Executable application | 170 |
| Program Group 1 | Executable embedded workflow folder | 170 |
| Program Group 2 | Executable embedded workflow folder | 225 |

At step 113, the top-most object on the list is assigned as the current object. Objects represented by icons which are the same (relative) distance from the top of the GUI folder are to be executed in parallel, so the processing, as represented at 120 in FIG. 5, loops through the sorted list, initiating all executable tasks that have the same (or very similar, perhaps within 5 pixels) relative distance from the top of the folder frame.

As represented at step 121, all objects in the folder which are not identified as "executable" are bypassed. These objects are presumed to contain documentation, data, or are unrelated system control files which are not to be executed as a program which is part of the workflow. In the example presented here and shown in FIGS. 1-3, the first three objects (ReadMe.doc, DataFile1.dat, and DataFile2.dat) would be bypassed. The first program initiated as part of this workflow would be Access Connections.

At step 122, a program, application, or another embedded executable workflow folder can be initiated, and the process flow proceeds immediately to the next step (if any) at the same geographic distance from the top of the workflow folder, while the previous program executes in parallel with any other programs on the same "level" (row) in the grid of icons. If the object to be executed is another embedded workflow folder, then the process flow depicted by the entire flowchart is applied recursively to this object.

As represented at step 123, execution of all programs, applications, or embedded workflow folders which are at the same "level" (icons are at the same geometric distance from the workflow folder top border) continues in parallel, until all these applications have either concluded successfully or have abended with a non-zero return code. Abend refers to an abnormal program end—an error code indicating a program did not complete as expected. For example, a program attempting an Internet connection might abend (abnormally end with a non-zero error code returned) if a modem or router is non-functional. If a program fails, the entire workflow fails, so that the workstation user can intervene and correct any problems that may arise. For example, a "prerequisite" program for Lotus Notes 8 Basic would be Access Connections, as it is assumed an Internet connection and firewall security access programs must finish successfully before Lotus Notes can initiate. It could also be the case that an application may be waiting for user input, such as AT&T Network Dialer may prompt for a password. The workflow will wait until this information is provided, and will continue to execute once this information is provided.

As represented at steps 124 and 125, when all executable objects represented by icons in the same relative horizontal position in the workflow folder have completed successfully, the next row (group of objects represented by icons with the next larger geometric distance from the workflow folder top frame) can be processed.

Figure 6:
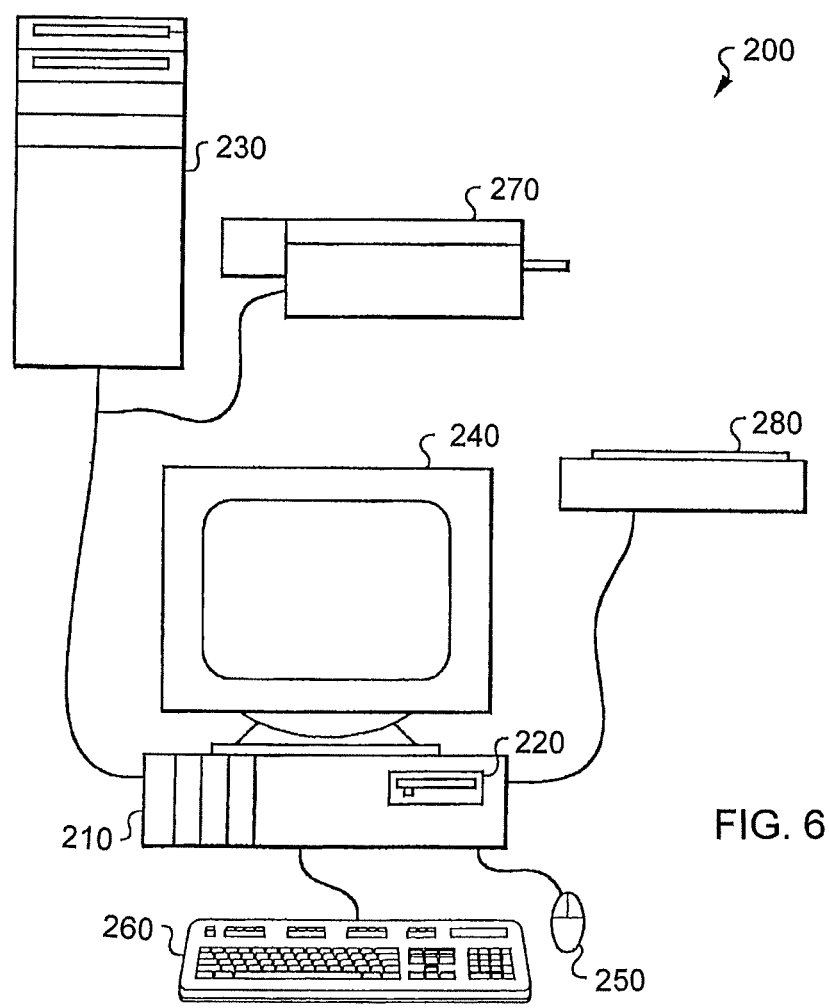
FIG. 6 depicts a computer system that may be used in the implementation of the present invention.

A computer-based system 200 in which a method embodiment of the invention may be carried out is depicted in FIG. 6. The computer-based system 200 includes a processing unit 210, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 210 through a disc drive 120, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 210, as mentioned, or may be located on a remote system such as a server 230, coupled to processing unit 210, via a network interface such as an Ethernet interface. Monitor 240, mouse 250 and keyboard 260 are coupled to the processing unit 210, to provide user interaction. Scanner 280 and printer 270 are provided for document input and output. Printer 270 is shown coupled to the processing unit 210 via a network connection, but may be coupled directly to the processing unit. Scanner 280 is shown coupled to the processing unit 210 directly, but it should be understood that peripherals might be network coupled, or direct coupled without affecting the performance of the processing unit 210.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

We claim:

1. A method of using task icons to designate the order in which a plurality of tasks are to be executed on a computer system, the method comprising:
    identifying an order in which to execute a plurality of tasks on the computer system;
    using a graphical user interface for showing a plurality of task icons in defined positions in a folder area in a view on a display screen of the computer system to designate the order in which the tasks are to be executed on the computer system, wherein each of the task icons represents a respective one of the tasks; and the task icons are located in a defined icon order in said view, and each of the task icons is in a specified position in said icon order;
    sorting the task icons arranged in the display by geometric height, and then executing the tasks represented by the task icons with reference to the respective height and arrangement of the task icons with respect to a top of the folder area, including
        maintaining a table identifying said respective height and arrangement of the task icons in the folder area on the display screen, including, for each of the task icons, including in the table icon position data identifying the position of said each task icon in the folder area in the view on the display screen;
        sorting the icon position data according to the respective height and arrangement of the task icons with respect to the top of the folder area to obtain a sorted list of the plurality of tasks, said sorted list listing the plurality of tasks in the order in which the plurality of tasks have been designated to be executed on the computer system, and wherein each of the tasks is in a specified position in said designated order, and the position of each task in said designated order is the same as the position of the task icon, that represents said each task, in the icon order; and
        executing the plurality of tasks on the computer system in the order of the tasks on the sorted list, whereby the plurality of tasks are executed in the designated order.

2. The method according to claim 1, wherein:
    the showing includes showing the plurality of task icons in a defined spatial order in said view; and
    the using includes using said defined spatial order to determine the order in which the tasks are to be executed by the computer system.

3. The method according to claim 1, wherein:
    said plurality of tasks comprise a multitude of tasks; and
    the executing includes executing some of the tasks in parallel and others of the tasks in series.

4. The method according to claim 1, wherein:
    the showing includes showing the task icons in a grid pattern, with the task icons in rows and columns; and
    the executing includes executing in sequence tasks represented by task icons shown in successive rows of the grid pattern; and executing in series tasks represented by task icons shown in the same row of the grid pattern.

5. The method according to claim 4, wherein:
    different rows of the grid pattern are located at different heights in said grid pattern;
    the executing in parallel includes executing in parallel all tasks represented by task icons in the same row; and the executing in series includes executing all of the tasks represented by the task icons in a higher one of the rows before executing any of the tasks represented by the task icons in a lower one of the rows.

6. The method according to claim 1, wherein:
the maintaining in a table icon position data identifying said respective height and arrangement of the task icons on the display screen includes:
obtaining a list of the geometric positions of the task icons in said view; and
the sorting the position data includes sorting the geometric positions of the icons according to the respective height and arrangement of the task icons with respect to the top of the folder area to obtain the sorted list of the plurality of tasks.

7. The method according to claim 1, wherein:
at least one of the task icons represents an embedded executable workflow folder;
the showing includes showing the task icons in a graphical user interface; and
using said graphical user interface to configure the positions of the task icons in the graphical user interface.

8. The method according to claim 1, wherein the showing includes:
electronically storing data for rendering the task icons in a specified file; and
designating said specified file as executable.

9. The method according to claim 1, wherein:
the computer system includes an Operating System;
the using includes making a call to the Operating System to obtain data for determining the positions of the task icons in said view; and
the executing includes executing the tasks in said order upon startup of the Operating System.

10. The method according to claim 1, wherein:
the showing a plurality of task icons includes showing a folder in said view on the display screen, and showing the task icons inside said folder;
the folder is limited to display only in icon format;
the maintaining a table data identifying the respective height and arrangement of the task icons on the display screen further includes for each of the task icons, identifying in said table a distance from said top of the folder area shown on the display screen to the position of said each task icon in said view; and
the sorting the icon position data includes listing the tasks in an order based on said distances from the top of on the folder area shown on the display screen to the positions in said view of the task icons representing the tasks.

11. The method according to claim 1, wherein:
the task icons are in a specified folder;
the specified folder includes objects that are not executable and embedded folders;
the showing includes showing in the view the objects that are not executable and the embedded folders; and
the executing the plurality of tasks includes bypassing the objects that are not executable and applying a process flow recursively to the embedded folders.

12. An ordering system for using task icons to designate the order in which a plurality of tasks are to be executed on a computer system, the ordering system comprising one or more processor units configured for:
identifying an order in which to execute a plurality of tasks on the computer system;
using a graphical user interface for showing a plurality of task icons in defined positions in a folder area in a view on a display screen of the computer system to designate the order in which the tasks are to be executed on the computer system, wherein each of the task icons represents a respective one of the tasks; and the task icons are located in a defined icon order in said view, and each of the task icons is in a specified position in said icon order;
sorting the task icons arranged in the display by geometric height, and then executing the task represented by the task icons with reference to the respective height and arrangement of the task icons with respect to a top of the folder area, including
maintaining a table icon position data identifying said respective height and arrangement of the task icons in the folder area on the display screen, including, for each of the task icons, including in the table icon position data identifying the position of said each task icon in the folder area in the view on the display screen;
sorting the icon position data according to the respective height and arrangement of the task icons with respect to the top of the folder area to obtain a sorted list of the plurality of tasks, said sorted list listing the plurality of tasks in the order in which the plurality of tasks have been designated to be executed on the computer system, and wherein each of the tasks is in a specified position in said designated order, and the position of each task in said designated order is the same as the position of the task icon, that represents said each task, in the icon order; and
executing the plurality of tasks on the computer system in the order of the tasks on the sorted list, whereby the plurality of tasks are executed in the designated order.

13. The ordering system according to claim 12, wherein said one or more processor units are further configured for:
executing the tasks in said workflow; and wherein:
said plurality of tasks comprise a multitude of tasks; and
the executing includes executing some of the tasks in parallel and others of the tasks in series.

14. The ordering system according to claim 12, wherein said one or more processor units are further configured for:
executing the tasks; and wherein:
the showing includes showing the task icons in a grid pattern, with the task icons in rows and columns; and
the executing includes executing in sequence tasks represented by task icons shown in successive rows of the grid pattern; and executing in series tasks represented by task icons shown in the same row of the grid pattern.

15. The ordering system according to claim 12, wherein:
the showing includes showing each of the task icons in a defined geometric position in said view; and
the maintaining a table data identifying said respective height and arrangement of the task icons on the display screen further includes:
obtaining a list of the geometric positions of the task icons in said view; and
sorting the geometric positions on said list according to the respective height and arrangement of the task icons with respect to the top of the folder area to obtain the sorted list of the geometric positions.

16. The ordering system according to claim 12, wherein:
the showing includes using said graphical user interface to configure the positions of the task icons in the graphical user interface.

17. An article of manufacture comprising:
at least one tangible computer readable hardware device having computer readable program code logic tangibly embodied therein to use tasks icons to designate the order in which a plurality of tasks are to be executed on a computer system, said computer readable program code logic, when executing, performing the following:
identifying an order in which to execute a plurality of tasks on the computer system;
using a graphical user interface for showing a multitude of the task icons in defined positions in a folder area in a view on a display screen of the computer system to designate the order in which the tasks are to be executed on the computer system, wherein each of the task icons represents a respective one of the tasks; and the task icons are located in a defined icon order in said view, and each of the task icons is in a specified position in said icon order;
sorting the task icons arranged in the display by geometric height, and then executing the tasks represented by the task icons with reference to the respective height and arrangement of the task icons with respect to a top of the folder area, including
   maintaining a table identifying said respective height and arrangement of the task icons in the folder area on the display screen, including, for each of the task icons, including in the table icon position data identifying the position of said each task icon in the folder area in the view on the display screen;
   sorting the icon position data according to the respective height and arrangement of the task icons with respect to the top of the folder area to obtain a sorted list of the plurality of tasks, said sorted list listing the plurality of tasks in the order in which the plurality of tasks have been designated to be executed on the computer system, and wherein each of the tasks is in a specified position in said designated order, and the position of each task in said designated order is the same as the position of the task icon, that represents said each task, in the icon order; and
   executing the plurality of tasks on the computer system in the order of the tasks on the sorted list, whereby the plurality of tasks are executed in the designated order.

18. The article of manufacture according to claim 17, wherein said program code logic, when executing, performs the following:
   executing some of the tasks in parallel and others of the tasks in series.

19. The article of manufacture according to claim 18, wherein:
   the showing includes showing the task icons in a grid pattern, with the task icons in rows and columns; and
   the executing includes executing in sequence tasks represented by task icons shown in successive rows of the grid pattern; and executing in series tasks represented by task icons shown in the same row of the grid pattern.

20. The article of manufacture according to claim 17, wherein:
   the showing includes showing each of the task icons in a defined geometric position in said view; and
   the maintaining a table data identifying said respective height and arrangement of the task icons on the display screen further includes:
      obtaining a list of the geometric positions of the task icons in said view; and
      sorting the geometric positions on said list according to the respective height and arrangement of the task icons with respect to the top of the folder area to obtain the sorted list of the geometric positions.

* * * * *